(12) United States Patent
Dry

(10) Patent No.: US 6,379,424 B1
(45) Date of Patent: Apr. 30, 2002

(54) DIRECT SMELTING APPARATUS AND PROCESS

(75) Inventor: Rodney James Dry, Beach (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/692,821

(22) Filed: Oct. 12, 2000

(30) Foreign Application Priority Data

Oct. 26, 1999 (AU) .............................................. PQ3657

(51) Int. Cl.$^7$ .............................................. C21B 11/00
(52) U.S. Cl. .............................. 75/500; 75/501; 75/502
(58) Field of Search .............................. 266/172, 265; 75/500, 501, 502

(56) References Cited

U.S. PATENT DOCUMENTS

| | | |
|---|---|---|
| 2,647,045 A | 7/1953 | Rummel |
| 3,844,770 A | 10/1974 | Nixon |
| 3,845,190 A | 10/1974 | Yosim et al. |
| 3,888,194 A | 6/1975 | Kishigamio et al. |

(List continued on next page.)

FOREIGN PATENT DOCUMENTS

| | | |
|---|---|---|
| AU | A-23864/84 | 1/1984 |
| AU | B-41064/85 | 4/1986 |
| AU | B-69707/87 | 9/1987 |
| AU | B-22448/88 | 5/1989 |

(List continued on next page.)

OTHER PUBLICATIONS

Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.
Patent Abstracts of Japan, C–627, p. 109, Jp. A, 01–127613 (Kawasaki Steel Corp.), May 19, 1989.
WPAT print–out for Brazilian patent application PI9400123–5 (Weber), Dec. 1995.
Patent Abstracts of Japan, C–951, JP, A, 4–63217 (Kawasaki Heavy Ind. Ltd.), Feb. 28, 1992.

(List continued on next page.)

*Primary Examiner*—Scott Kastler
(74) *Attorney, Agent, or Firm*—Merchants & Gould, P.C.

(57) ABSTRACT

A vessel which produces metal from a feed material by direct smelting is disclosed. The vessel contains a molten bath having a metal layer (15) and a slag layer (16) on the metal layer and a gas continuous space (31) above the slag layer. The vessel includes one or more lances/tuyeres (13) extending downwardly into the vessel and injecting an oxygen-containing gas into the vessel and injecting an oxygen-containing bas into the vessel above the metal and slag layer. The vessel includes a plurality of pairs of lances/tuyeres (11) extending downwardly and inwardly into the vessel and injecting feed material with a carrier gas into the molten bath so as to penetrate the metal layer and generate a bath-derived gas flow which carries molten material upwardly. The pairs of lances/tuyeres are spaced around the circumference of the vessel with one lance/tuyere of each pair injecting metalliferous feed material, at a temperature of at least 200° C. and the other lance/tuyere of each pair injecting carbonaceous material, at a temperature less than 200° C.

8 Claims, 2 Drawing Sheets

U.S. PATENT DOCUMENTS

| | | |
|---|---|---|
| 3,890,908 A | 6/1975 | von Klenck et al. |
| 3,894,497 A | 7/1975 | Helke et al. |
| 4,007,034 A | 2/1977 | Hartwig et al. |
| 4,053,301 A | 10/1977 | Stephens, Jr. |
| 4,145,396 A | 3/1979 | Grantham |
| 4,177,063 A | 12/1979 | Dickson |
| 4,207,060 A | 6/1980 | Zangs |
| 4,356,035 A | 10/1982 | Brotzmann et al. |
| 4,389,043 A | 6/1983 | Weber et al. |
| 4,400,936 A | 8/1983 | Evans |
| 4,402,274 A | 9/1983 | Meenan et al. |
| 4,431,612 A | 2/1984 | Bell et al. |
| 4,447,262 A | 5/1984 | Gay et al. |
| 4,455,017 A | 6/1984 | Wunsche |
| 4,468,298 A | 8/1984 | Byrne et al. |
| 4,468,299 A | 8/1984 | Byrne et al. |
| 4,468,300 A | 8/1984 | Byrne et al. |
| 4,481,891 A | 11/1984 | Takeshita et al. |
| 4,504,043 A | 3/1985 | Yamaoka et al. |
| 4,511,396 A | 4/1985 | Nixon |
| 4,565,574 A | 1/1986 | Katayama et al. |
| 4,566,904 A | 1/1986 | von Bogdandy et al. |
| 4,572,848 A | 2/1986 | Bedell |
| 4,574,714 A | 3/1986 | Bach et al. |
| 4,602,574 A | 7/1986 | Bach et al. |
| 4,664,618 A | 5/1987 | Gitman |
| 4,681,599 A | 7/1987 | Obkircher |
| 4,684,448 A | 8/1987 | Itoh et al. |
| 4,701,214 A | 10/1987 | Kaneko et al. |
| 4,718,643 A | 1/1988 | Gitman |
| 4,786,321 A | 11/1988 | Hoster et al. |
| 4,790,516 A | 12/1988 | Suigura et al. |
| 4,798,624 A | 1/1989 | Brotzmann et al. |
| 4,804,408 A | 2/1989 | Puhringer |
| 4,849,015 A | 7/1989 | Fassbinder et al. |
| 4,861,368 A | 8/1989 | Brotzmann et al. |
| 4,874,427 A | 10/1989 | Hamada et al. |
| 4,890,562 A | 1/1990 | Gitman |
| 4,913,734 A | 4/1990 | Romenets et al. |
| 4,923,391 A | 5/1990 | Gitman |
| 4,940,488 A | 7/1990 | Maeda et al. |
| 4,946,498 A | 8/1990 | Weber |
| RE33,464 E | 11/1990 | Gitman |
| 4,976,776 A | 12/1990 | Elvander et al. |
| 4,999,097 A | 3/1991 | Sadoway |
| 5,005,493 A | 4/1991 | Gitman |
| 5,024,737 A | 6/1991 | Claus et al. |
| 5,037,608 A | 8/1991 | Tarcy et al. |
| 5,042,964 A | 8/1991 | Gitman |
| 5,050,848 A | 9/1991 | Hardie et al. |
| 5,051,127 A | 9/1991 | Hardie et al. |
| 5,065,985 A | 11/1991 | Takahashi et al. |
| 5,177,304 A | 1/1993 | Nagel |
| 5,191,154 A | 3/1993 | Nagel |
| 5,222,448 A | 6/1993 | Morgenthaler et al. |
| 5,238,646 A | 8/1993 | Tarcy et al. |
| 5,271,341 A | 12/1993 | Wagner |
| 5,279,715 A | 1/1994 | La Camera et al. |
| 5,301,620 A | 4/1994 | Nagel et al. |
| 5,302,184 A | 4/1994 | Batterham et al. |
| 5,322,547 A | 6/1994 | Nagel et al. |
| 5,332,199 A | 7/1994 | Knapp et al. |
| 5,333,558 A | 8/1994 | Lees, Jr. |
| 5,396,850 A | 3/1995 | Conochi et al. |
| 5,401,295 A | 3/1995 | Brotzmann |
| 5,407,461 A | 4/1995 | Hardie et al. |
| 5,415,742 A | 5/1995 | La Camera et al. |
| 5,443,572 A | 8/1995 | Wilkison et al. |
| 5,480,473 A | 1/1996 | Hardie et al. |
| 5,489,325 A | 2/1996 | Keogh et al. |
| 5,498,277 A | 3/1996 | Floyd et al. |
| 5,518,523 A | 5/1996 | Brotzmann |
| 5,529,599 A | 6/1996 | Calderon |
| 5,613,997 A | 3/1997 | Satchell, Jr. |
| 5,630,862 A | 5/1997 | Greenwalt |
| 5,640,708 A | 6/1997 | Conochie et al. |
| 5,647,888 A | 7/1997 | Keogh et al. |
| 5,683,489 A | 11/1997 | Hayashi et al. |
| 5,741,349 A | 4/1998 | Hubble et al. |
| 5,800,592 A | 9/1998 | den Hartog et al. |
| 5,802,097 A | 9/1998 | Gensini et al. |
| 5,869,018 A | 2/1999 | Stephens, Jr. |
| 5,871,560 A | 2/1999 | Fluch et al. |
| 5,938,815 A | 8/1999 | Satchell, Jr. |
| 6,143,054 A | * 11/2000 | Dry .......................... 75/500 |

FOREIGN PATENT DOCUMENTS

| | | |
|---|---|---|
| AU | B-26831/88 | 7/1989 |
| AU | B-28802/89 | 8/1989 |
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592 830 A1 | 4/1994 |
| EP | 657 550 | 6/1995 |
| GB | 2 043 696 A | 10/1980 |
| GB | 2 088 892 A | 6/1982 |
| WO | WO 89/01981 | 3/1989 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 98/27232 | 6/1998 |
| WO | WO 98/27239 | 6/1998 |
| WO | WO 99/16911 | 4/1999 |

OTHER PUBLICATIONS

Patent abstracts of Japan, C–497, p. 115, JP, A, 62–280315 (Nippon Kokan K.K), Dec. 15, 1987.

Derwent Abstract Accession No. 87–039748/06, JP, A, 61–295334, Dec. 26, 1986.

International Search Report PCT/IAU00/00938, Dec. 2000.

U.S. application No. 09/550,421, Dry, filed Apr. 17, 2000.

U.S. application No. 09/160,913, Dry, filed Sep. 25, 1998.

U.S. application No. 09/331,277, Jai, filed Jun. 17, 1999.

U.S. application No. 09/331,272, Bates, filed Jun. 17, 1999.

U.S. application No. 09/509,314, Bates, filed Mar. 21, 2000.

U.S. application No. 09/535,665, Leigh, filed Mar. 21, 2000.

U.S. application No. 09/462,282, McCarthy, filed Mar. 16, 2000.

U.S. application No. 09/478,750, Dry, filed Jan. 6, 2000.

U.S. application No. 09/509,286, MCarthy, filed Mar. 21, 2000.

U.S. application No. 09/509,264, Dry, filed Mar. 21, 2000.
U.S. application No. 09/509,290, Dry, filed Mar. 21, 2000.
U.S. application No. 09/509,323, Dry, filed Mar. 21, 2000.
U.S. application No. 09/587,774, Bates, filed Jun. 6, 2000.
U.S. application No. 09/611,514, Bates, filed Jul. 7, 2000.
U.S. application No. 09/632,730, Dry, filed Aug. 4, 2000.
U.S. application No. 09/634,059, Burke, filed Aug. 9, 2000.
U.S. application No. 09/669,397, Batterham, filed Sep. 26, 2000.
U.S. application No. 09/685,488, Burke, filed Oct. 10, 2000.

* cited by examiner

DIRECT SMELTING APPARATUS AND PROCESS

The present invention relates to an apparatus and a process for producing molten metal (which term includes metal alloys), in particular although by no means exclusively iron, from metalliferous feed material, such as ores, partially reduced ores and metal-containing waste streams, in a metallurgical vessel containing a molten bath.

The present invention relates particularly to a molten metal bath-based direct smelting apparatus and a process for producing molten metal from a metalliferous feed material.

A process that produces molten metal directly from ores (and partially reduced ores) is generally referred to as a "direct smelting process".

One known direct smelting process, which is generally referred to as the Romelt process, is based on the use of a large volume, highly agitated slag bath as the medium for smelting top-charged metal oxides to metal and for post-combusting gaseous reaction products and transferring the heat as required to continue smelting metal oxides. The Romelt process includes injection of oxygen enriched air or oxygen into the slag via a lower row of tuyeres to provide slag agitation and injection of oxygen into the slag via an upper row of tuyeres to promote post-combustion. In the Romelt process the metal layer that forms below the slag is not an important reaction medium.

Another known group of direct smelting processes that are slag-based is generally described as "deep slag" processes. These processes, such as DIOS and AISI processes, are based on forming a deep layer of slag. As with the Romelt process, the metal layer below the slag layer is not an important reaction medium.

Another known direct smelting process which relies on a molten metal layer as a reaction medium, and is generally referred to as the HIsmelt process, is described in International application PCT/AU96/00197 (WO 96/31627) in the name of the applicant.

The HIsmelt process as described in the International application comprises:
(a) forming a molten bath having a metal layer and a slag layer on the metal layer in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting the metalliferous feed material to metal in the metal layer.

The HIsmelt process also comprises post-combusting reaction gases, such as CO and $H_2$, released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there are ascending and thereafter descending droplets or splashes or streams of molten metal and slag which provide an effective medium to transfer to the bath the thermal energy generated by post-combusting reaction gases above the bath.

A preferred form of the HIsmelt process is characterized by forming the transition zone by injecting carrier gas, metalliferous feed material, solid carbonaceous material and optionally fluxes into the bath through lances that extend downwardly and inwardly through side walls of the vessel so that the carrier gas and the solid material penetrate the metal layer and cause molten material to be projected from the bath.

This form of the HIsmelt process is an improvement over earlier forms of the process which form the transition zone by bottom injection of carrier gas and solid carbonaceous material through tuyeres into the bath which causes droplets, splashes and streams of molten material to be projected from the bath.

The applicant has carried out extensive pilot plant work on the above-described preferred form of the HIsmelt process in a pilot plant vessel having a hearth diameter of 2.74 m. The size of pilot plant vessel, whilst rated to produce 100,000 tonnes of molten metal per year, is smaller than that of a commercial size vessel. A commercial size vessel is one that is capable of producing at least 500,000 tonnes of molten metal per year. Typically, a commercial size vessel is one that is capable of producing 1–1.5 million tonnes of molten metal per year. Necessarily, such a commercial size vessel would have a hearth diameter that is larger than 2.74 m. During and subsequent to the pilot plant work the applicant has carried out development work on a vessel for a commercial operation. The present invention was made in the course of that development work.

According to the present invention there is provided a vessel which produces metal from a metalliferous feed material by a direct smelting process, which vessel contains a molten bath having a metal layer and a slag layer on the metal layer and has a gas continuous space above the slag layer, which vessel includes:
  (a) a shell;
  (b) a hearth formed of refractory material having a base and sides in contact with the molten bath.
  (c) side walls which extend upwardly from the sides of the hearth and are in contact with the slag layer and the gas continuous space
  (d) one or more than one lance/tuyere extending downwardly into the vessel and injecting an oxygen-containing gas into the vessel above the metal and slag layer;
  (e) a plurality of pairs of lances/tuyeres extending downwardly and inwardly into the vessel and injecting feed material which includes metalliferous feed material and carbonaceous material with a carrier gas into the molten bath so as to penetrate the metal layer and generate a bath-derived gas flow which carries molten material upwardly from the metal layer and the slag layer as splashes, droplets and streams of molten material and forms a transition zone in the gas continuous space, the pairs of lances/tuyeres being spaced around the circumference of the vessel, one lance/tuyere of each pair injecting feed material, primarily metalliferous feed material, at a temperature of at least 200° C. (hereinafter referred to as the "hot" lance/tuyere), and the other lance/tuyere of each pair injecting feed material, primarily carbonaceous material, at a temperature less than 200° C. (hereinafter referred to as a "cold" lance/tuyere); and
  (f) a means for tapping molten metal and slag from the vessel.

Preferably the vessel is a commercial size vessel that is capable of producing at least 500,000 tonnes of molten metal per year.

Preferably the hot lance/tuyere injects feed material at a temperature of at least 600° C.

The term "primarily" in the context of a nominated feed material is understood to mean that at least 50% by weight of the feed material injected through a given lance/tuyere is the nominated feed material.

Preferably the feed material is in a solid state. The feed material may be in liquid or gas state as well as solid state. By way of example, the carbonaceous material may be in solid, liquid or gas state.

Preferably the hot lance/tuyere injects no volatile carbonaceous material.

The hot lance/tuyere may inject non-volatile carbonaceous material, such as char.

Typically, the host lance/tuyere injects metalliferous feed material and non-volatile carbonaceous material at the temperature of at least 200° C.

The injection of feed material through the cold lance/tuyere is not confined to carbonaceous material and, by way of example, may include plant reverts.

Preferably the lances/tuyeres of any given pair of lances/tuyeres are positioned with respect to each other so that the lances/tuyeres inject feed material towards a point spaced from the pair of lances/tuyeres.

The term "smelting" is understood herein to mean thermal processing wherein chemical reactions that reduce metal oxides takes place to produce liquid metal.

The term "metal layer" is understood herein to mean that region of the bath that is predominantly metal. Specifically, the term covers a region or zone that includes a dispersion of molten slag in a metal continuous volume.

The term "slag layer" is understood herein to mean that region of the bath that is predominantly slag. Specifically, the term covers a region or zone that includes a dispersion of molten metal in a slag continuous volume.

The metalliferous feed material may be any suitable material and in any suitable form. A preferred metalliferous feed material is an iron-containing material. The iron-containing material may be in the form of ores, partially reduced ores, DRI (direct reduced iron), iron carbide, millscale, blast furnace dust, sinter fines, BOF dust or a mixture of such materials.

In the case of partially reduced ores, the degree of pre-reduction may range from relatively low levels (eg to FeO) to relatively high levels (eg 70 to 95% metallisation).

The carrier gas for the hot lances/tuyeres may be the same as or different to the carrier gas for the cold lances/tuyeres.

It is preferred that the carrier gas for the cold lances/tuyeres contain no oxygen or be an oxygen-deficient gas.

It is preferred that the carrier gas comprise nitrogen.

The transition zone is quite different to the slag layer. By way of explanation, under stable operating conditions of the process the slag layer comprises gas bubbles in a liquid continuous volume whereas the transition zone comprises splashes, droplets, and streams of molten material, predominantly slag, in a gas continuous volume.

Preferably oxygen-containing gas injected into the vessel post-combusts reaction gases, such as carbon monoxide and hydrogen, generated in the molten bath, in a top space (including the transition zone) above the surface of the molten bath and the heat generated by the post-combustion is transferred to the metal layer to maintain the temperature of the molten bath—as is essential in view of endothermic reactions in that layer.

The injection of the solid feed material, such as in the form of metalliferous feed material and solid carbonaceous material, through the pairs of lances/tuyeres towards and thereafter into the metal layer has the following consequences:

(a) the momentum of the injected solid material/carrier gas (and any liquid or gaseous feed material) causes the solid material/carrier gas to penetrate the metal layer;

(b) the carbonaceous material, typically coal, is devolatilised and thereby produces gas in the metal layer;

(c) carbon predominantly dissolves into the metal and partially remains as solid;

(d) the metalliferous material is smelted to metal by carbon derived from injected carbon as described above in item (c) and the smelting reaction generates carbon monoxide gas; and (e) the gases transported into the metal layer and generated via devolatilisation and smelting produce significant buoyancy uplift of molten metal, solid carbon and slag (which is drawn into the metal layer as a consequence of solid/gas injection) from the metal layer which results in upward movement of splashes, droplets and streams of molten material, and these splashes, droplets, and streams entrain further slag as they move upwardly.

Preferably the location and operating parameters of the one or more than one lance/tuyere that inject the oxygen-containing gas and the operating parameters that control the transition zone are selected so that:

(a) the oxygen-containing gas is injected towards and penetrates the transition zone;

(b) the transition zone extends upwardly around the lower section of the or each lance/tuyere and thereby shields to some degree the side walls of the vessel from the combustion zone generated at the end of the or each lance/tuyere; and (e) there is gas continuous space described as a "free space" which contains practically no metal and slag around the end of the or each lance/tuyere.

Item (c) above is an important feature because it makes it possible for reaction gases in the top space of the vessel to be drawn into the region at the end of the or each lance/tuyere and be post-combusted in the region.

Preferably the vessel includes at least two oxygen-containing gas injection lances/tuyeres.

Preferably the vessels contain a relatively high (but not too high) slag inventory and the amount of slag is used as a means of controlling the process.

The term "relatively high slag inventory" may be understood in the context of the amount of slag compared to the amount of meal in the vessel.

According to the present invention there is also provided a direct smelting process for producing metal from a metalliferous feed material in a metallurgical vessel as described above, which process includes the steps of:

(a) forming a molten bath having a metal layer and a slag layer on the metal layer in the vessel;

(b) injecting feed material which includes metalliferous feed material and carbonaceous material with a carrier gas into the molten bath via a plurality of pairs of lances/tuyeres, with one lance/tuyere of each pair injecting feed material, primarily metalliferous feed material, at a temperature of at least 200° C., and the other lance/tuyere of each pair injecting feed material, primarily carbonaceous material, at a temperature of less than 200° C., and smelting metalliferous material in the metal layer, whereby the feed material and carrier gas injection causes gas flow from the metal layer, which gas flow entrains molten material in the metal layer and carries molten material upwardly as splashes, droplets and streams and forms a transition zone in a gas continuous space in the vessel above the slag layer;

(c) smelting metalliferous feed material to metal in the metal layer; and (d) injecting an oxygen-containing gas into the vessel via one or more than one lance/tuyere and post-combusting reaction gases released from the molten bath, whereby ascending and thereafter descending splashes, droplets and streams of molten material facilitate heat transfer to the molten bath, and whereby the transition zone minimises radiation heat loss from the vessel via the side walls in contact with the transition zone.

BRIEF DESCRIPTION OF THE DRAWINGS

The present invention is described further by way of example with reference to the accompanying drawings of which.

Figure 1:
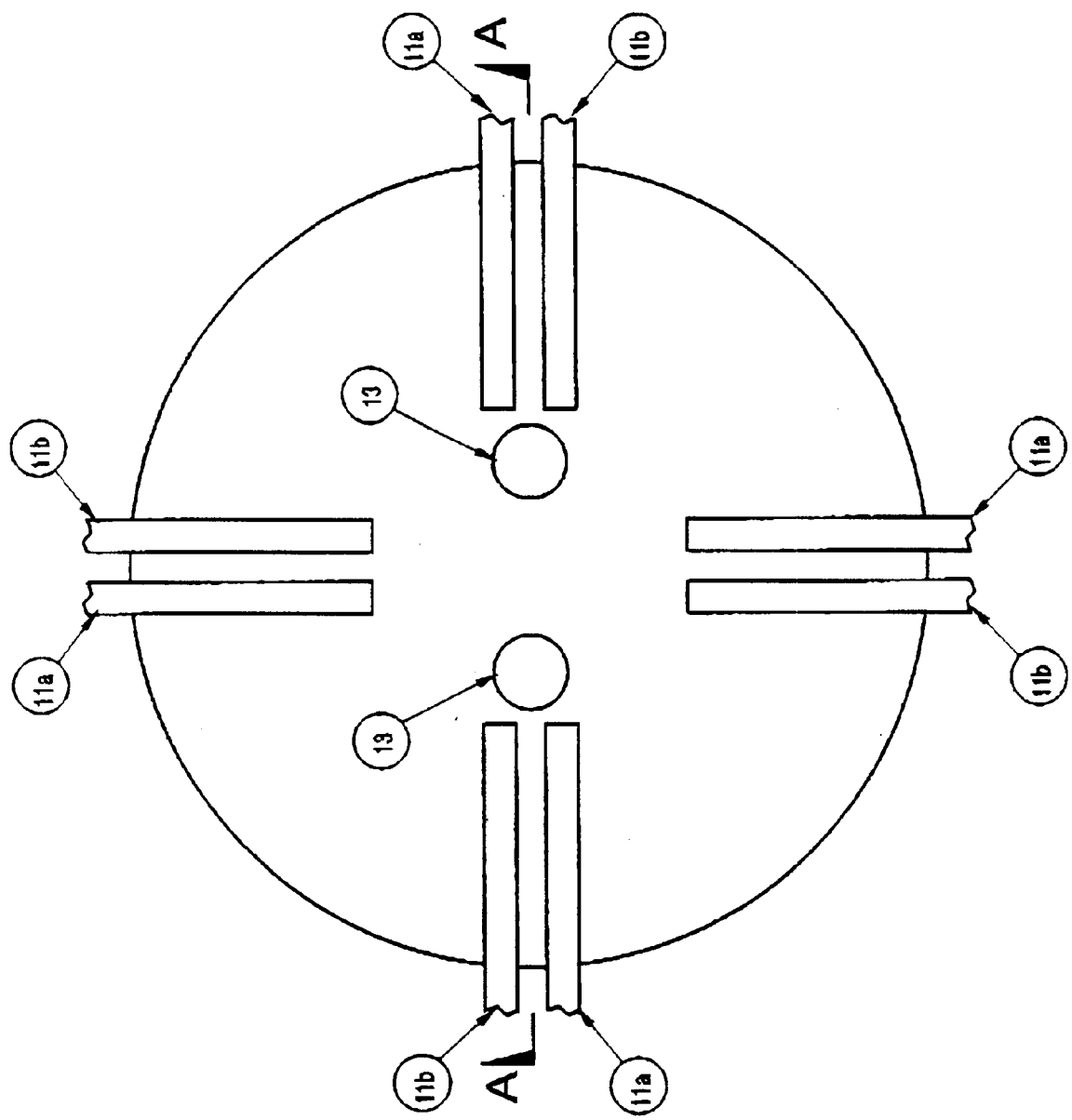
FIG. 1 is a top plan view in schematic form of a preferred embodiment of a vessel of the present invention with the roof of the vessel removed and illustrating the general arrangement of pairs of lances/tuyeres around the circumference of the vessel.
Figure 2:
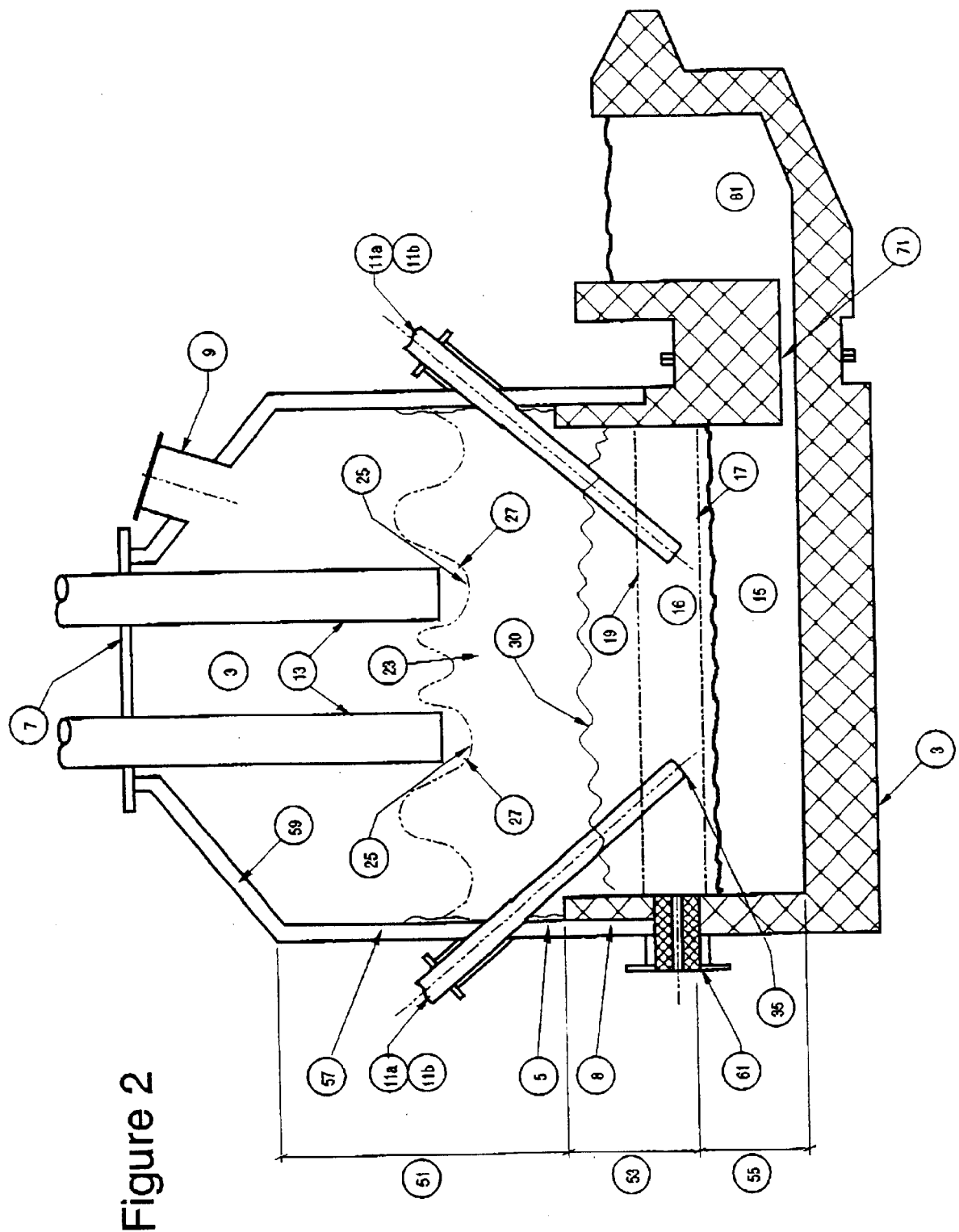
FIG. 2 is a vertical section through the vessel along the line A—A of FIG. 1.

The following description is in the context of smelting iron ore to produce molten iron and it is understood that the present invention is not limited to this application and is applicable to any suitable metallic ores and/or concentrates—including partially reduced metallic ores and waste revert materials.

The vessel shown in the figures has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 81 which can discharge molten iron continuously; a forehearth connection 71 that interconnects the hearth and the forehearth 81; and a tap-hole 61 for discharging molten slag.

In use, the vessel contains a molten bath of iron and slag which includes a layer 15 of molten iron and a layer 16 of molten slag on the metal layer 15. The arrow marked by the numeral 17 indicates the position of the nominal quiescent surface of the iron layer 15 and the arrow marked by the numeral 19 indicates the position of nominal quiescent surface of the slag layer 16. The term "quiescent surface" is understood to mean the surface when there is no injection of gas and solids into the vessel.

The vessel also includes 4 pairs of solids injection lances/tuyeres 11a, 11b extending downwardly and inwardly at an angle of 30–60° to the vertical through the side walls 5 and into the slag layer 16. A "hot" lance/tuyere 11a of each pair is arranged to inject iron ore and a carrier gas at a temperature of at least 200° C. into the vessel and a "cold" lance/tuyere 11b of each pair is arranged to inject cold coal and a carrier gas at a temperature of less than 200° C. into the vessel. Typically, the carrier gas is nitrogen or any other suitable inert gas. The positions of the lances/tuyeres 11a, 11b of each pair are selected so that the lances/tuyeres of any given pair inject solid material towards substantially the same point in the vessel. Furthermore, the positions of the lances/tuyeres 11a, 11b are selected so that the lower ends are above the quiescent surface 17 of the iron layer 15 under steady-state process conditions.

The iron ore and the carrier gas for the hot lances/tuyeres 11a may be heated to a temperature of at least 200° C. by any suitable means (not shown).

In use, iron ore, solid carbonaceous material (typically coal), and fluxes (typically lime and dolomite) entrained in a carrier gas (typically $N_2$) are injected into the iron layer 15 via the lances/tuyeres 11a, 11b. The momentum of the solid material/carrier gas causes the solid material and gas to penetrate the iron layer 15. The coal is devolatilised and thereby produces gas in the iron layer 15. Carbon partially dissolves into the metal and partially remains as solid carbon. The iron ore is smelted to metal and the smelting reaction generates carbon monoxide gas. The gases transported into the metal layer 15 and generated via devolatilisation and smelting produce significant buoyancy uplift of molten metal, solid carbon, and slag (drawn into the iron layer 15 as a consequence of solid/gas/injection) from the iron layer 15 which generates an upward movement of splashes, droplets and streams of molten material, and these splashes, and droplets, and streams entrain slag as they move through the slag layer 16.

The applicant has found in the pilot plant work that generating a gas flow rate from the iron layer 15 of at least 0.30 $Nm^3/s/m^2$ of the area of the iron layer 15 (calculated at quiescent metal level 17) causes substantial agitation in the iron layer 15 and the slag layer 16, with the result that:

(a) the slag layer 16 expands in volume and has a surface indicated by the arrow 30; and (b) the iron layer 15 and the slag layer 16 are each substantially homogenous in that there are reasonably uniform temperatures throughout each layer, typically, 1450–1550° C. and reasonably uniform compositions throughout each layer.

The above-described upward movement of the bath-derived gas and resultant buoyancy uplift of molten material and solid carbon from the iron layer 15 produces:

(a) a transition zone 23; and (b) projects some molten material (predominantly slag) beyond the transition zone and onto the part of the upper barrel section 51 of the side walls 5 that is above the transition zone 23 and onto the roof 7.

In general terms, the slag layer 16 is a liquid continuous volume, with gas bubbles therein, and the transition zone 23 is a gas continuous volume with splashes, droplets, and streams of molten metal and slag.

The vessel further includes two vertically extending lances 13 for injecting an oxygen-containing gas (typically pre-heated oxygen enriched air) into the vessel. The positions of the lances 13 and the gas flow rate through the lances 13 are selected so that under steady-state process conditions the oxygen-containing gas penetrates the transition zone 23 and maintains an essentially metal/slag free space 25 around the end of the lances 13.

In use, the injection of the oxygen-containing gas via the lances 13 post-combusts reaction gases CO and $H_2$ in the transition zone 23 and in the free space 25 around the end of the lances 13 and generates high temperatures of the order of 2000° C. or higher in the gas space. The heat is transferred to the ascending and descending splashes droplets, and streams, of molten material in the region of gas injection and the heat is then partially transferred to the iron layer 15 when the metal/slag returns to the iron layer 15.

The free space 25 around the end of each lance 13 is important to achieving high levels of post combustion, is more than 40%, because it enables entrainment of gases in the space above the transition zone 23 into the end region of the lance 13 and thereby increases exposure of available reaction gases to post combustion.

The combined effect of the positions of the lances 13, gas flow rate through the lances 13, and upward movement of splashes, droplets and streams of molten material is to shape the transition zone 23 around the lower region of the lances 13—generally identified by the numerals 27. These shaped regions provide a partial barrier to heat transfer by radiation to the side walls 5.

Moreover, the ascending and descending droplets, splashes and streams of molten material are an effective means of transferring heat from the transition zone 23 to the molten bath with the result that the temperature of the transition zone 23 in the region of the side walls 5 is of the order of 1450° C.–1550° C.

The vessel is constructed with reference to the levels of the iron layer 15, the slag layer 16, and the transition zone 23 in the vessel when the process is operating under steady-state process conditions and with reference to splashes, droplets and streams of molten material that are projected into the top space 31 above the transition zone 23 when the process is operating under steady-state operating conditions, so that:

(a) the hearth and the lower barrel section 53 of the side walls 5 that contact the iron/slag layers 15/16 are formed from bricks of refractory material (indicated by the cross-hatching in the figure);

(b) at least part of the lower barrel section 53 of the side walls 5 is backed by water cooled panels 8; and (c) the upper barrel section 51 of the side walls 5 and the roof 7 that contact the transition zone 23 and the top space 31 are formed from water cooled panels 57, 59.

Each of the water cooled panels 8, 57, 59 has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent straight sections of each pipe and between the pipes.

The water inlets and the water outlets of the pipes are connected to a water supply circuit (not shown) which circulates water at high flow rate through the pipes.

Many modifications may be made to the preferred embodiment of the present invention described without departing from the spirit and scope theory.

What is claimed is:

1. A direct smelting process for producing metal from a metalliferous feed material in a metallurgical vessel which process includes the steps of:

(a) forming a molten bath having a metal layer and a slag layer on the metal layer in the vessel;

(b) injecting feed material which includes metalliferous feed material and carbonaceous material with a carrier gas into the molten bath via a plurality of pairs of lances/tuyeres extending downwardly and inwardly into the vessel, with a first lance/tuyere of each pair injecting metalliferous feed material at a temperature of at least 200° C., and a second lance/tuyere of each pair injecting carbonaceous material at a temperature of less than 200° C., and smelting metalliferous material in the molten bath, whereby the feed material and carrier gas injection causes gas flow that entrains molten material in the metal layer and carries molten material upwardly as splashes, droplets and streams and forms a transition zone in a gas continuous space in the vessel above the slag layer;

(c) injecting an oxygen-containing gas into the vessel via one or more than one lance/tuyere extending downwardly into the vessel and post-combusting reaction gases released from the molten bath, whereby ascending and thereafter descending splashes, droplets and streams of molten material facilitate heat transfer to the molten bath, and whereby the transition zone minimizes radiation heat loss from the vessel via the side walls in contact with the transition zone; and (d) tapping molten metal and slag from the vessel.

2. The process defined in claim 1 including injecting the metalliferous feed material through the first lance/tuyere at a temperature of at least 600° C.

3. The process defined in claim 1 including injecting the metalliferous feed material with no volatile carbonaceous material through the first lance/tuyere.

4. The process defined in claim 1 including injecting non-volatile carbonaceous material through the first lance/tuyere.

5. The process defined in claim 4 including injecting the metalliferous feed material and the non-volatile carbonaceous material at a temperature of at least 200° C. through the first lance/tuyere.

6. The process defined in claim 1 including injecting the feed material of a given pair of lances/tuyeres towards a point spaced from the pair of lances/tuyeres.

7. The process defined in claim 1 wherein the metalliferous feed material is an iron-containing material.

8. The process defined in claim 1 wherein the carrier gas for the second lance/tuyere contains no oxygen or in an oxygen-deficient gas.

* * * * *